United States Patent
Kim (10) Patent No.: US 9,672,170 B2
(45) Date of Patent: Jun. 6, 2017

(54) SEMICONDUCTOR MEMORY

(71) Applicant: SK hynix Inc., Icheon-si, Gyeonggi-do (KR)

(72) Inventor: Ki Up Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 501 days.

(21) Appl. No.: 14/160,873

(22) Filed: Jan. 22, 2014

(65) Prior Publication Data

US 2015/0095522 A1 Apr. 2, 2015

(30) Foreign Application Priority Data

Sep. 30, 2013 (KR) .................. 10-2013-0116279

(51) Int. Cl.
 *G06F 3/00* (2006.01)
 *G06F 13/16* (2006.01)
 *G06F 3/06* (2006.01)
 *G06F 1/32* (2006.01)

(52) U.S. Cl.
 CPC ........ *G06F 13/1668* (2013.01); *G06F 1/3203* (2013.01); *G06F 3/067* (2013.01); *G06F 3/0635* (2013.01)

(58) Field of Classification Search
 None
 See application file for complete search history.

(56) References Cited

U.S. PATENT DOCUMENTS

| 6,041,016 | A | * | 3/2000 | Freker | .................. G11C 8/12 365/230.02 |
| 2003/0081492 | A1 | * | 5/2003 | Farrell | ............... G11C 11/4087 365/238.5 |
| 2009/0196103 | A1 | * | 8/2009 | Kim | ........................ G11C 8/08 365/185.12 |

FOREIGN PATENT DOCUMENTS

KR 1020100083219 A 7/2010

* cited by examiner

*Primary Examiner* — Henry Tsai
*Assistant Examiner* — Dean Phan
(74) *Attorney, Agent, or Firm* — William Park & Associates Ltd.

(57) ABSTRACT

A semiconductor memory in accordance with an embodiment includes: a control unit configured to generate a plurality of second control signals in response to a page size signal and a plurality of first control signals; a plurality of input/output switches configured to be coupled to each of a plurality of unit memory blocks and activated in response to the plurality of second control signals; and a plurality of page change switches configured to couple data lines of the plurality of unit memory blocks in response to the page size signal.

24 Claims, 7 Drawing Sheets

SEMICONDUCTOR MEMORY

CROSS-REFERENCES TO RELATED PATENT APPLICATION

The present application claims priority under 35 U.S.C. 119(a) to Korean Application No. 10-2013-0116279, filed on Sep. 30, 2013, in the Korean Intellectual Property Office, which is incorporated herein by reference in its entirety as set forth in full.

BACKGROUND

1. Technical Field

Various embodiments relate to a semiconductor circuit, and more particularly, to a semiconductor memory.

2. Related Art

A semiconductor memory is designed to meet a specification of a page size.

In this case, the page size may be defined by the number of bit lines which is simultaneously operated at the time of an active operation of the semiconductor memory.

Figure 1:
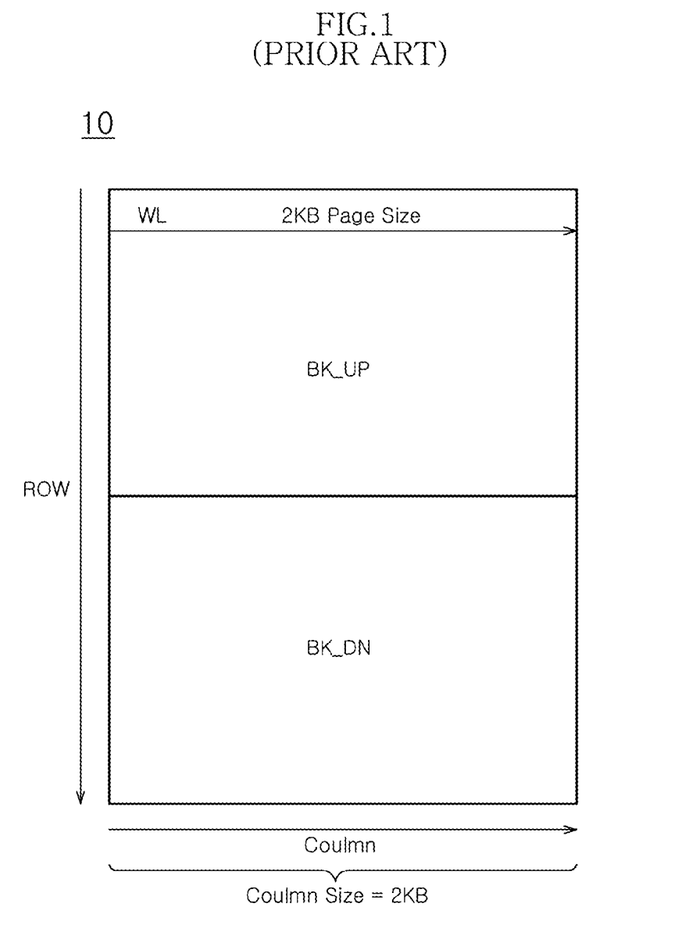
FIGS. 1 and 2 are block diagrams illustrating a structure of a semiconductor memory 10 having a 2 KB page size in accordance with the related art.

For example, FIG. 1 illustrates a core structure of a semiconductor memory 10 which is designed to meet a 2 KB page size.

In this case, the core may include a bank which is a memory block.

The bank may be divided into an upper bank BK_UP and a lower bank BK_DN.

When the page size is set to be 2 KB, a column of the bank becomes 2 KB.

In the structure, as one word line WL is activated, the bit lines of 2 KB are simultaneously operated.

Figure 2:
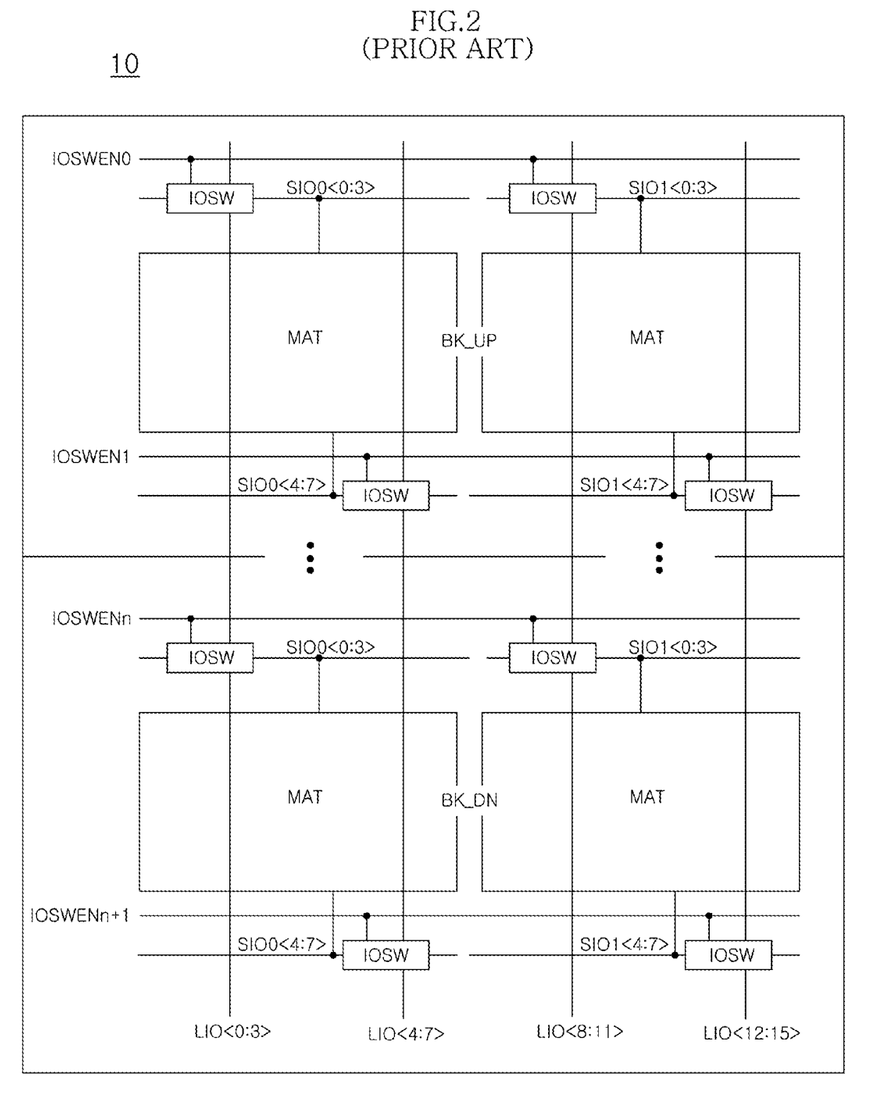

As illustrated in FIG. 2, describing an internal structure of the core of FIG. 1, four segment input/output lines SIO are each connected to upper/lower portions of each unit memory block, that is, each mat MAT.

The segment input/output lines SIO are connected to local input/output lines LIO through input/output switches IOSW, such that a total of 16 data by 8 data for each mat MAT in the upper bank BK_UP or the lower bank BK_DN are output.

Figure 3:
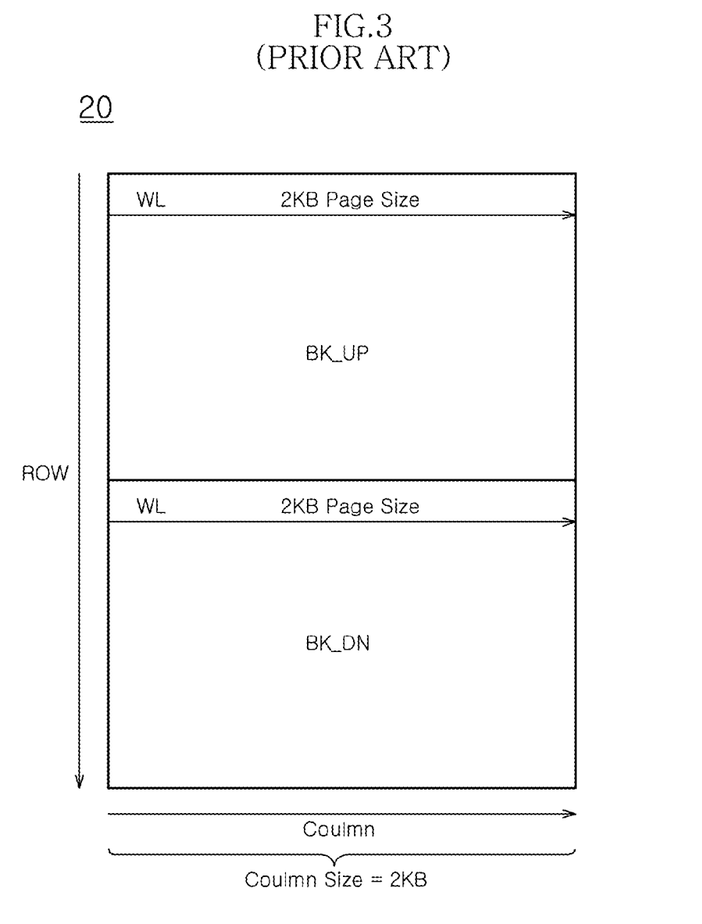
FIGS. 3 and 4 are block diagrams illustrating a structure of a semiconductor memory 20 having a 4 KB page size in accordance with the related art.

Meanwhile, FIG. 3 illustrates a core structure of a semiconductor memory 20 which is designed to meet a 4 KB page size.

In the structure, as two word lines WL by one in the upper bank BK_UP and the lower bank BK_DN, respectively, are simultaneously activated, bit lines of 4 KB are simultaneously operated.

Figure 4:
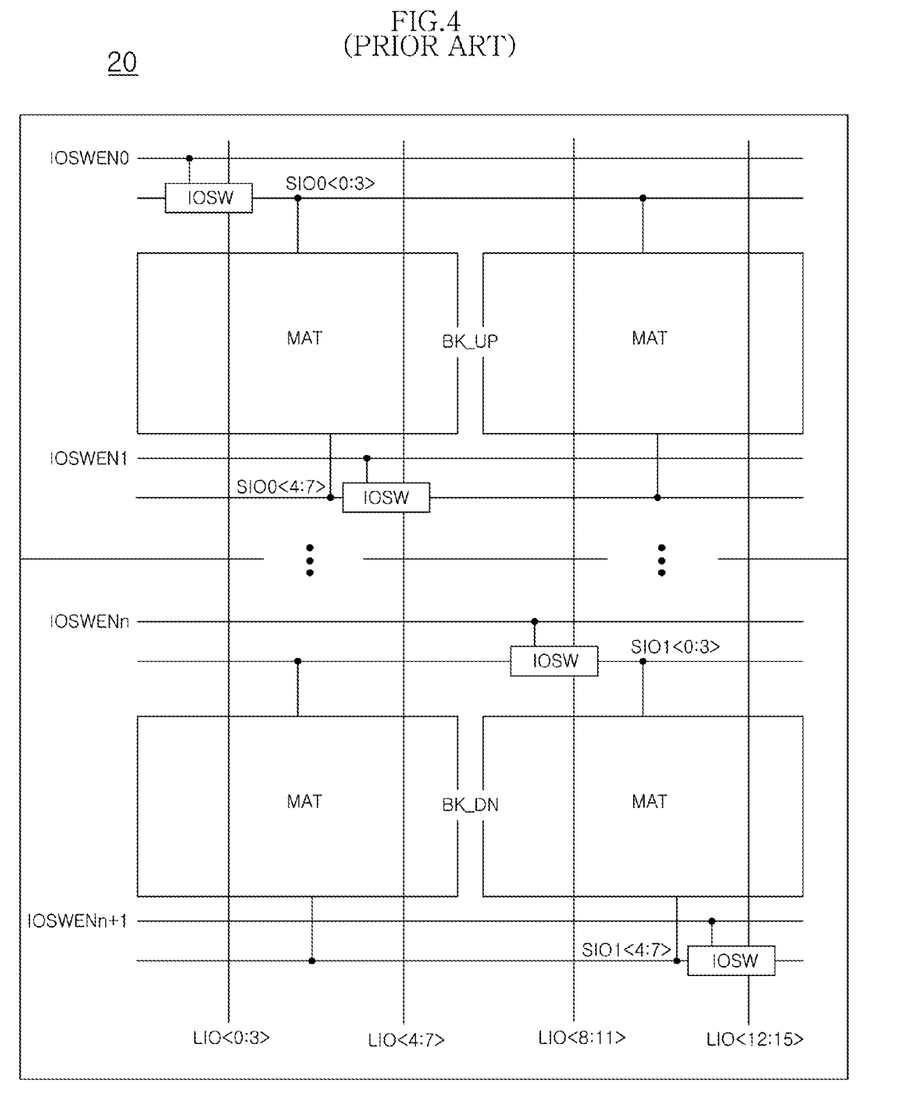

As illustrated in FIG. 4, describing an internal structure of the core of FIG. 3, two mats MAT share the segment input/output line SIO.

The segment input/output lines SIO are connected to the local input/output lines LIO through the input/output switches IOSW, such that a total of 16 data by 8 data in the upper bank BK_UP or the lower bank BK_DN, respectively, are output.

As described above, the semiconductor memory in accordance with the related art has different core structures for each page size.

Therefore, the related art has a problem in that the semiconductor memory is manufactured as a separate chip depending on the page size.

SUMMARY

An embodiment of the present invention is directed to a semiconductor memory capable of implementing different page sizes by one core structure.

A semiconductor memory in accordance with an embodiment includes: a control unit configured to generate a plurality of second control signals in response to a page size signal and a plurality of first control signals; a plurality of input/output switches configured to be coupled to each of a plurality of unit memory blocks and activated in response to the plurality of second control signals; and a plurality of page change switches configured to couple data lines of the plurality of unit memory blocks in response to the page size signal.

A semiconductor memory in accordance with an embodiment includes: first and second unit memory blocks configured to be coupled to a first segment input/output line and a second input/output line and share a first local input/output line; and third and fourth unit memory blocks configured to be coupled to a third segment input/output line and a fourth segment input/output line and share a second local input/output line, in which the semiconductor memory may be configured to be operated in different page sizes by connecting or disconnecting between the first segment input/output line and the second segment input/output line and between the third segment input/output line and the fourth segment input/output line.

A system in accordance with an embodiment of the present invention comprises: a processor; a controller configured to receive a request and a data from the processor; and a memory unit configured to receive the request and the data from the controller, wherein the memory unit includes: a control unit configured to generate a plurality of second control signals in response to a page size signal and a plurality of first control signals; a plurality of input/output switches configured to be coupled to each of a plurality of unit memory blocks and activated in response to the plurality of second control signals; and a plurality of page change switches configured to couple data lines of the plurality of unit memory blocks in response to the page size signal.

These and other features, aspects, and embodiments are described below in the section "Detailed Description."

BRIEF DESCRIPTION OF THE DRAWINGS

Features, aspects, and embodiments are described in conjunction with the attached drawings, in which.

DETAILED DESCRIPTION

Hereinafter, embodiments of the present invention will be described in detail with reference to the accompanying drawings.

Figure 5:
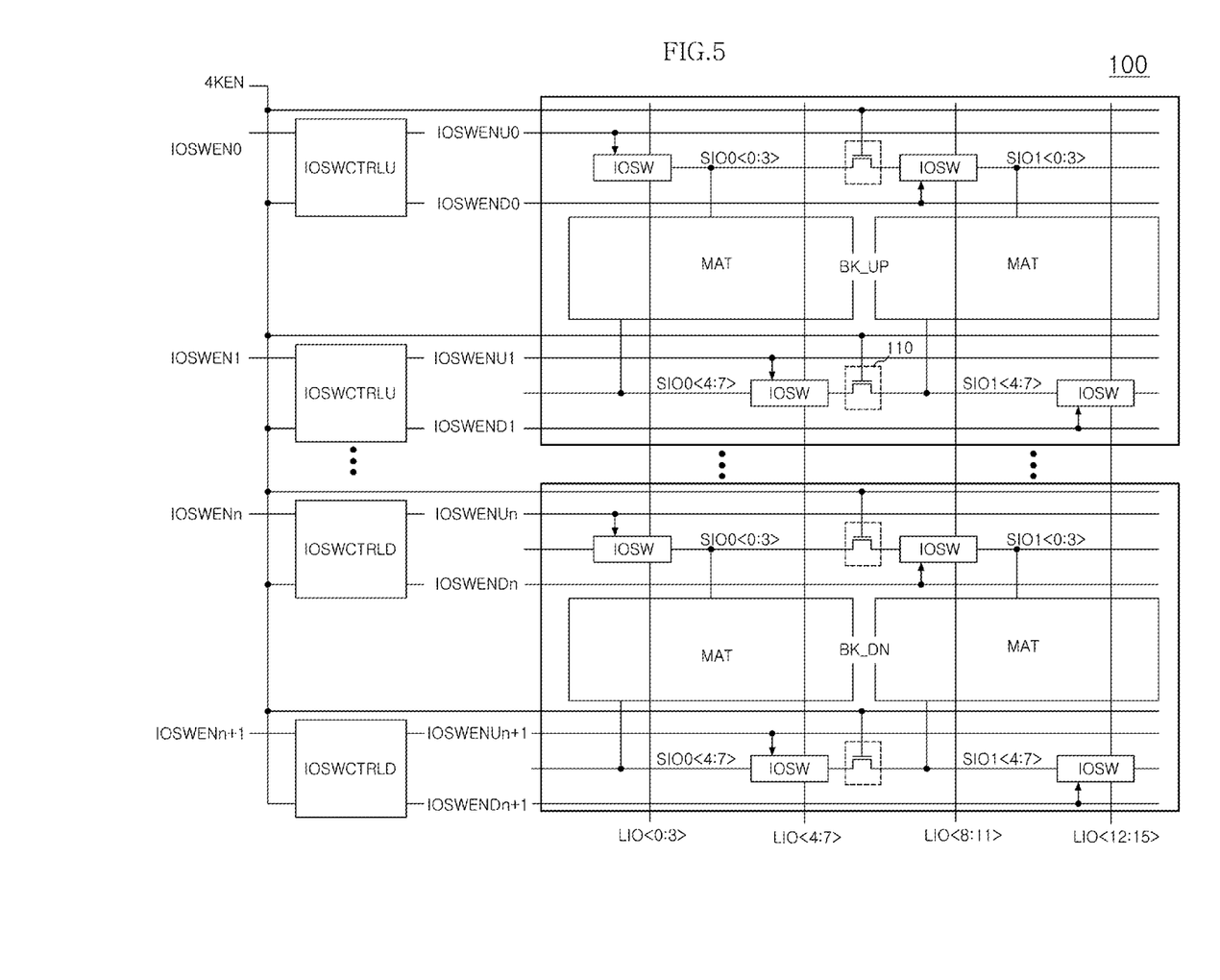
FIG. 5 is a detailed block diagram illustrating a structure of a semiconductor memory 100 in accordance with an embodiment of the present invention.

As illustrated in FIG. 5, a semiconductor memory 100 in accordance with an embodiment of the present invention may include a bank which is a memory block and a plurality of control units IOSWCTRLU and IOSWCTRLD.

The bank may be divided into a first memory block, that is, an upper bank BK_UP and a second memory block, that is, a lower bank BK_DN.

The upper bank BK_UP may include a plurality of unit memory blocks, a plurality of input/output switching units IOSW, and a plurality of page change switches 110.

In this case, the unit memory block may be a mat MAT.

The input/output switching units IOSW may be coupled to each of the plurality of mats MAT.

The plurality of input/output switching units IOSW may be each coupled between first signal lines SIO and second signal lines LIO.

The plurality of input/output switching units IOSW may be configured to connect or disconnect between the first signal lines SIO and the second signal lines LIO in response to a plurality of second control signal pairs IOSWENU0/IOSWEND0 to IOSWENUn+1/IOSWENDn+1.

In this case, the first signal lines SIO which are segment input/output lines may be coupled to bit lines of the mat MAT.

The second signal lines LIO may be local input/output lines. Accordingly, one of the mats MAT in the upper bank BK_UP and one of the mats MAT in the lower bank BK_DN may constitute first and second unit memory blocks configured to be each coupled to a first segment input/output line SIO0<0:3>, and a second segment input output line SIO0<4:7> and share a first local input/output line LIO<0:3>. In addition, one of the mats MAT in the upper bank BK_UP and one of the mats MAT in the lower bank BK_DN may constitute a third and fourth unit memory blocks configured to be each coupled to a third segment input/output line SIO1<0:3> and a fourth segment input/output line SIO1<4:7> and share a second local input output line LIO<8:11>. In addition, the semiconductor memory 100 may be configured to be operated in different page sizes by connecting or disconnecting between the first segment input/output line SIO0<0:3> and the second segment input/output line SIO0<4:7> and between the third segment input/output line SIO1<0:3> and the fourth segment input/output line SIO1<4:7> in response to a page size signal. The semiconductor memory 100 may be configured to couple between the first segment input/output line SIO0<0:3> and the first local input/output line LIO<0:3> and couple between the second segment input/output line SIO0<4:7> and the second local input/output line LIO<8:11>; or to couple between the third segment input/output line SIO1<0:3> and the first local input/output line LIO<0:3> and couple between the fourth segment input/output line SIO1<4:7> and the second local input/output line LIO<8:11>.

The input/output switching units IOSW may include input/output switches as many as the number of first signal lines SIO which is coupled to the input/output switching units IOSW.

For example, an input/output switching unit IOSW of a first signal line SIO0<0:3> may include four input/output switches.

The input/output switching units IOSW may be each coupled to upper and lower portions of each mat MAT.

The plurality of page change switch units 110 may be each coupled between two input/output switching units IOSW which are each coupled to a pair of mats MAT.

The plurality of page change switching units 110 may be each configured of a plurality of transistors (for example, NMOS transistors).

Each of the transistors has gates receiving a page size signal 4KEN, sources be coupled to any one of the two input/output switching units IOSW, and drains coupled to the other of the two input/output switching units IOSW.

The pair of mats MAT may be two adjacent mats MAT.

The plurality of page change switch units 110 may be configured to connect or disconnect between the two input/output switching units IOSW which are each coupled to the pair of mats MAT in response to the page size signal 4KEN. The plurality of page change switch units 110 may be configured to couple data lines or the first signal lines SIO and the second signal lines LIO of the plurality of mats MAT to teach other in a unit of a pair of the mats Mat in response to the page size signal 4KEN. Further, the plurality of change switch units 110 may be configured to connect or disconnect between the first segment input/output line SIO0<0:3> and the second segment input/output line SIO0<4:7>; and connect or disconnect between the third segment input/output line SIO1<0:3> and the fourth segment input/output line SIO1<4:7> in response to the page size signal 4KEN. The semiconductor memory 100 may be configured to output data to the unit memory blocks or mats MAT belonging to a first group among the pair or plurality of mats MAT in a unit of one pair or in one of a unit of one pair; or to output data to the mats MAT belonging to a second group among the plurality of mats MAT in a unit of one pair or in one of a unit of one pair.

In this case, a value of the page size signal 4KEN may be changed by a mode register, a test mode, or the like and if necessary, may be fixed to a specific value (high level or low level) using a fuse, a bonding pad, or the like. The semiconductor memory 100 is configured to couple one of the first segment input/output line SIO0<0:3> and the third segment input/output line SIO1<0:3> to the first local input/output line LIO<0:3> in response to the page size signal 4KEN; and to couple one of the second segment input/output line SIO0<4:7> and the fourth segment input/output line SIO1<4:7> to the second local input/output line LIO<8:11>.

The lower bank BK_DN may include the plurality of mats MAT, the plurality of input/output switching units IOSW, and the plurality of page change switches 110.

The input/output switching units IOSW may be coupled to each of the plurality of mats MAT.

The input/output switching units IOSW may be coupled between the first signal lines SIO and the second signal lines LIO.

The input/output switching units IOSW may include input/output switches as many as the number of first signal lines SIO which is coupled to the input/output switching units IOSW.

In the case of the first signal line SIO0<0:3>, the input/output switching unit IOSW may include the four input/output switches.

The input/output switching units IOSW may be each coupled to upper and lower portions of each mat MAT. In addition, the plurality of input/output switching units IOSW may be configured to couple each of the first segment input/output line SIO0<0:3> and the third segment input/output line SIO1<0:3> to the first local input/output line LIO<0:3>; and couple each of the second segment input/output line SIO0<4:7> and the fourth segment input/output line SIO1<4:7> to the second local input/output line LIO<8:11>.

The plurality of page change switch units 110 may be each connected between the two input/output switching units IOSW which are each coupled to the pair of mats MAT.

In this case, the pair of mats MAT may be the two adjacent mats MAT.

The plurality of page change switch units 110 may be configured to connect or disconnect between the two input/output switching units IOSW which are each coupled to the pair of mats MAT in response to the page size signal 4KEN.

The plurality of control units IOSWCTRLU and IOSWCTRLD may be configured to generate a plurality of second control signal pairs IOSWENU0/IOSWEND0 to IOSWENUn+1/IOSWENDn+1 to select all or one of the two input/output switching units IOSW which are each coupled to the pair of mats MAT in response to the page size signal 4KEN and the plurality of first control signals IOSWEN0 and IOSWENn+1.

In this case, the plurality of first control signals IOSWEN0–IOSWENn+1, that is, the input/output switch activation signal may be activated in response to an activation of a row active signal.

For example, as the one word line is activated by the row active signal, the pair of first control signals associated with the mat MAT corresponding to the activated word line may be activated.

Figure 6:
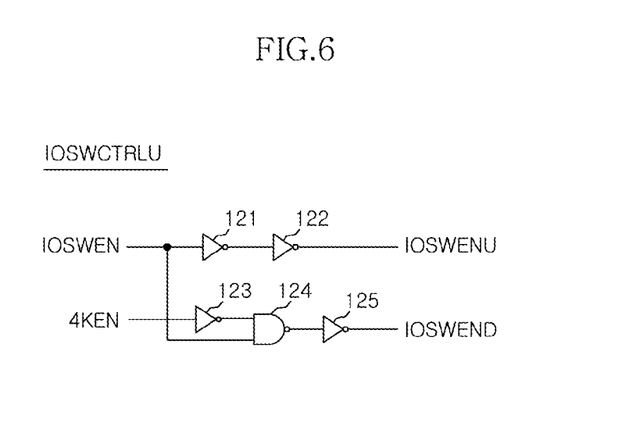
FIG. 6 is a circuit diagram illustrating a configuration of an input/output switch control unit IOSWCTRLU of FIG. 5.

As illustrated in FIG. 6, the plurality of control units IOSWCTRLU may each include a plurality of logic gates 121 to 125.

When the page size signal 4KEN is a level (for example, low level) which defines the first page size (for example, 2 KB), the plurality of control units IOSWCTRLU may be each configured to output the first control signal IOSWEN as a second control signal pair IOSWENU/IOSWEND. Further, the semiconductor memory 100 may be configured to disconnect data lines or the first signal lines SIO and the second signal lines LIO of the plurality of mats MAT from each other. Moreover, the semiconductor memory 100 may be configured to disconnect the first segment input/output line SIO0<0:3> and the second segment input/output line SIO0<4:7>; and between the third segment input/output line SIO1<0:3> and the fourth segment input/output line SIO1<4:7>. The semiconductor memory 100 may be configured to couple the first segment input/output line SIO0<0:3> or the second segment input/output line SIO0<4:7> to the first local input/output line LIO<0:3>; and to couple the fourth segment input/output line SIO1<4:7> or the third segment input/output line SIO1<0:3> to the second local input/output line LIO<8:11>.

When the page size signal 4KEN is a level (for example, high level) which defines the second page size (for example, 4 KB), the plurality of control units IOSWCTRLU may be each configured to inactivate the second control signal IOSWEND at the low level independent of the first control signal IOSWEN and output the first control signal IOSWEN as the second control signal IOSWENU. Moreover, when the page size signal 4KEN defines a second page size, the semiconductor memory 100 may be configured to couple the data lines or the first or the first signal lines SIO and the second signal lines LIO of the plurality of mats MAT in a unit of a pair of the mats MAT. The semiconductor memory 100 may be configured to couple between the first segment input/output line SIO0<0:3> and the second segment input/output line SIO0<4:7> and between the third segment input/output line SIO1<0:3> and the fourth segment input/output line SIO1<4:7>.

Figure 7:
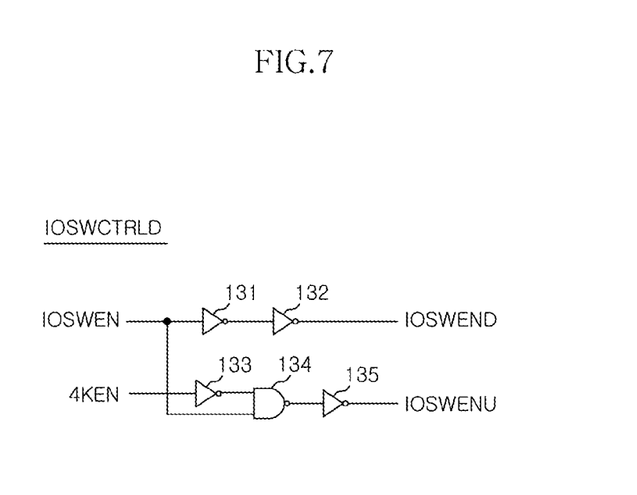
FIG. 7 is a circuit diagram illustrating a configuration of an input/output switch control unit IOSWCTRLD of FIG. 5.

As illustrated in FIG. 7, the plurality of control units IOSWCTRLD may each include a plurality of logic gates 131 to 135.

When the page size signal 4KEN is a level (for example, low level) which defines the first page size (for example, 2 KB), the plurality of control units IOSWCTRLD may be each configured to output the first control signal IOSWEN as the second control signal pair IOSWENU/IOSWEND.

When the page size signal 4KEN is a level (for example, high level) which defines the second page size (for example, 4 KB), the plurality of control units IOSWCTRLD may be each configured to inactivate the second control signal IOSWEND at the low level independent of the first control signal IOSWEN and output the first control signal IOSWEN as the second control signal IOSWENU.

An operation of the semiconductor memory in accordance with an embodiment of the present invention configured as described above will be described below with reference to FIGS. 5 to 7.

First, the operation of the semiconductor memory when the page size signal 4KEN is the high level defining the first page size 2 KB will be described.

When the page size signal 4KEN defines the first page size 2 KB, the one word line may be activated.

For example, as the one word line is activated in the upper bank BK_UP, it is assumed that the first control signal pair IOSWEN0/IOSWEN1 of the plurality of first control signals IOSWEN0 to IOSWENn+1 is activated at the high level.

Since the page size signal 4KEN is the low level, the plurality of page change switching units 110 are turned off, such that all of the different first signal lines may be disconnected from each other.

Since the page size signal 4KEN is the low level, the control units IOSWCTRLU receiving the first control signal pairs IOSWEN0/IOSWEN1 activate all the second control signals IOSWENU0, IOSWEND0, IOSWENU1, and IOSWENU1 at the high level.

The control units IOSWCTRLU and IOSWCTRLD receiving the rest first control signals IOSWEN2 to IOSWENn+1 other than the first control signal pair IOSWEN0/IOSWEN1 inactivate all the second control signals IOSWENU2 and IOSWEND2 to IOSWENUn+1 and IOSWENUn+1 at the low level.

The input/output switching units IOSW of the upper bank BK_UP which is turned on by the activated second control signals IOSWENU0, IOSWEND0, IOSWENU1, and IOSWENU1 couple first signal lines SIO0<0:3>, SIO0<4:7>, SIO1<0:3>, and SIO1<4:7> with second signal lines LIO<0:3><4:7><8:11><12:15>.

Therefore, a total of 16 data by 8 data in each mat MAT of the upper bank BK_UP may be output through the second signal lines LIO<0:3><4:7><8:11><12:15>.

Next, the operation of the semiconductor memory when the page size signal 4KEN is the high level defining the second page size 4 KB will be described.

When the page size signal 4KEN is the second page size 4 KB, the two word lines may be simultaneously activated.

As the two word lines are simultaneously activated, the pair of first control signals associated with the mats MAT corresponding to each of the activated word lines is activated.

For example, as the word lines are activated one by one in the upper bank BK_UP and the lower bank BK_DN, it is assumed that the two pairs of first control signals IOSWEN0/IOSWEN1 and IOSWENn/IOSWENn+1 of the plurality of first control signals IOSWEN0 to IOSWENn+1 is activated at the high level.

Since the page size signal 4KEN is the high level, the plurality of page change switching units 110 are turned on, such that the different first signal lines, that is, SIO0<0:3> and SIO1<0:3> are coupled to each other and SIO0<4:7> and SIO1<4:7> are coupled to each other.

Since the page size signal 4KEN is the high level, the control units IOSWCTRLU receiving the first control signal pairs IOSWEN0/IOSWEN1 activate the second control signals IOSWEND0 and IOSWEND1 at the low level and activate the second control signals IOSWENU0 and IOSWENU1 at the high level.

The control units IOSWCTRLD receiving the first control signal pairs IOSWENn/IOSWENn+1 inactivate second control signals IOSWENUn and IOSWENUn+1 at the low level and activate second control signals IOSWENDn and IOSWENDn+1 at the high level.

The input/output switching units IOSW which are turned on by the activated second control signals IOSWENU0, IOSWENU1, IOSWENDn, and IOSWENDn+1 couple the first signal lines SIO0<0:3>, SIO0<4:7>, SIO1<0:3>, and SIO1<4:7> with the second signal lines LIO<0:3><4:7><8:11><12:15>.

Therefore, a total of 16 data by 8 data in each mat MAT of the upper bank BK_UP and the lower bank BK_DN may be output through the second signal lines LIO<0:3><4:7><8:11><12:15>.

Figure 8:
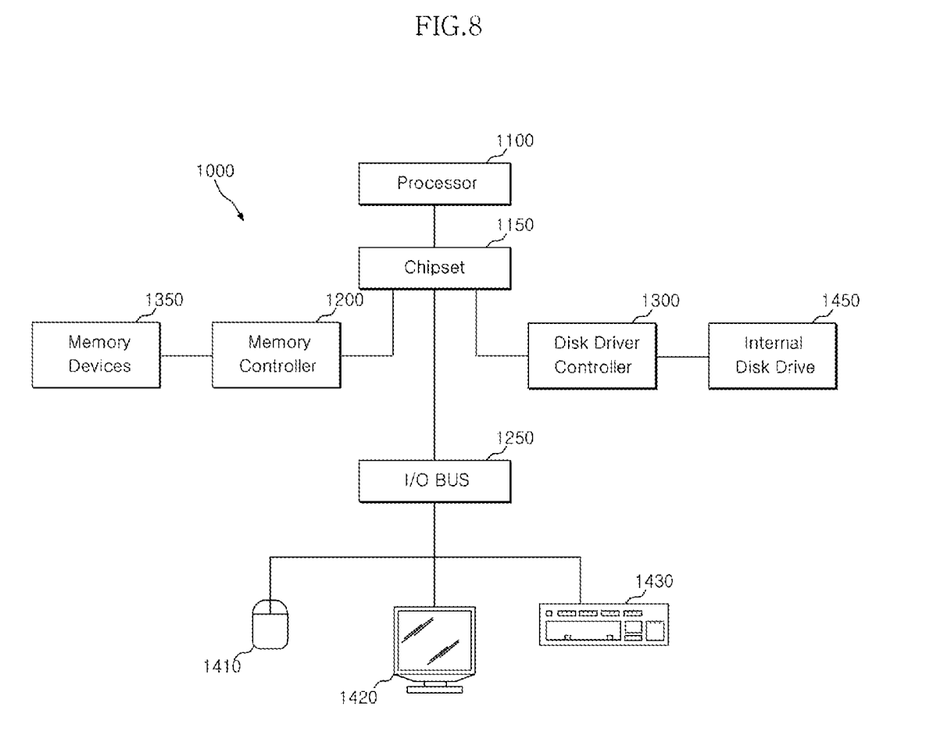
FIG. 8 illustrates a block diagram of a system employing a memory controller circuit in accordance with an embodiment of the present invention.

Referring to FIG. 8, a system 1000 may include one or more processors 1100. The processor 1100 may be used individually or in combination with other processors.

A chipset 1150 may be operably coupled to the processor 1100. The chipset 1150 is a communication pathway for signals between the processor 1100 and other components of the system 1000, which may include a memory controller 1200, an input/output ("I/O") bus 1250, and a disk drive controller 1300. Depending on the configuration of the system 1000, any one of a number of different signals may be transmitted through the chipset 1150.

The memory controller 1200 may be operably coupled to the chipset 1150. The memory controller 1200 may include at least one memory controller that can receive a request provided from the processor 1100 through the chipset 1150. The memory controller 1200 may be operably coupled to one or more memory devices 1350. The memory devices 1350 may correspond to the semiconductor memory 100 described above.

The chipset 1150 may also be coupled to the I/O bus 1250. The I/O bus 1250 may serve as a communication pathway for signals from the chipset 1150 to the I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430.

The disk drive controller 1300 may also be operably coupled to the chipset 1150. The disk drive controller 1300 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

In accordance with the embodiments of the present invention, the semiconductor memory may be operated in different page sizes by the one core structure.

It may be understood by those skilled in the art to which the present invention pertains that the present invention may be implemented as other specific forms without changing the spirit or essential feature thereof. Therefore, it should be understood that the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A semiconductor memory, comprising:
 a control unit configured to generate a plurality of second control signals in response to a page size signal and a plurality of first control signals;
 a plurality of input/output switches configured to couple first data line sets of a plurality of unit memory blocks with second data line sets in response to the plurality of second control signals; and
 a plurality of page change switches configured to couple one set of the first data line sets of one of the plurality of unit memory blocks with another set of the first data line sets of another of the plurality of unit memory blocks in response to the page size signal,
 wherein the plurality of input/output switches are directly coupled to the plurality of page switches.

2. The semiconductor memory of claim 1, wherein when the page size signal defines a first page size, the semiconductor memory is configured to disconnect the one set of the first data line sets from the another set of the first data line sets by disconnecting input/output switches coupled one of the plurality of unit memory blocks from input/output switches coupled another of the plurality of unit memory blocks.

3. The semiconductor memory of claim 2, wherein the semiconductor memory is configured to output data to the unit memory blocks belonging to a first group among the plurality of unit memory blocks in a unit of one pair or
 to output data to the unit memory blocks belonging to a second group among the plurality of unit memory blocks in a unit of one pair.

4. The semiconductor memory of claim 1, wherein when the page size signal defines a second page size, the semiconductor memory is configured to couple the one set of the first data line sets with the another set of the first data line sets by connecting input/output switches coupled one of the plurality of unit memory blocks to input/output switches coupled another of the plurality of unit memory blocks in a unit of a pair of the unit memory blocks.

5. The semiconductor memory of claim 4, wherein the semiconductor memory is configured to output data to the unit memory blocks belonging to a first group among the plurality of unit memory blocks in one of a unit of one pair or
 to output data to the unit memory blocks belonging to a second group among the plurality of unit memory blocks in one of a unit of one pair.

6. The semiconductor memory of claim 1, wherein the plurality of first control signals are selectively activated by a row active signal.

7. A semiconductor memory, comprising:
 a plurality of input/output switches;
 a plurality of page change switches;
 first and second unit memory blocks configured to be coupled to a first segment input/output line and a second segment input/output line; and third and fourth unit memory blocks configured to be coupled to a third segment input/output line and a fourth segment input/output line, wherein the first and third unit memory blocks are configured to share a first local input/output line using the plurality of input/output switches and the second and fourth unit memory blocks are configured to share a second local input/output line using the plurality of input/output switches, and wherein the semiconductor memory is configured to be operated in different page sizes by connecting or disconnecting between the first segment input/output line and the second segment input/output line using the plurality of page change switches and between the third segment input/output line and the fourth segment input/output line using the plurality of page change switches, wherein the plurality of input/output switches are directly coupled to the plurality of page change switches.

8. The semiconductor memory of claim 7, wherein the semiconductor memory is configured to couple one of the first segment input/output line and the third segment input/output to the first local input/output line in response to a page size signal; and to couple one of the second segment input/output line and the fourth segment input/output line to the second local input/output line.

9. The semiconductor memory of claim 7, wherein when a page size signal defines a first page size, the semiconductor memory is configured to disconnect between the first segment input/output line and the second segment input/output line and between the third segment input/output line and the fourth segment input/output line.

10. The semiconductor memory of claim 9, wherein the semiconductor memory is configured to couple between the first segment input/output line and the first local input/output line and couple between the second segment input/output line and the second local input/output line or to couple between the third segment input/output line and the first local input/output line and couple between the fourth segment input/output line and the second local input/output line.

11. The semiconductor memory of claim 9, wherein when the page size signal defines a second page size, the semiconductor memory is configured to couple between the first segment input/output line and the second segment input/output line and between the third segment input/output line and the fourth segment input/output line.

12. The semiconductor memory of claim 11, wherein the semiconductor memory is configured to couple the first segment input/output line or the second segment input/output line to the first local input/output line, and to couple the fourth segment input/output line or the third segment input/output line to the second local input/output line.

13. The semiconductor memory of claim 7, further comprising:

a plurality of page change switches configured to connect or disconnect between the first segment input/output line and the second segment input/output line and connect or disconnect between the third segment input/output line and the fourth segment input/output line in response to a page size signal.

14. The semiconductor memory of claim 7, further comprising:

a plurality of input/output switches configured to couple each of the first segment input/output line and the third segment input/output line to the first local input/output line and couple each of the second segment input/output line and the fourth segment input/output line to the second local input/output line.

15. The semiconductor memory of claim 14, further comprising:

a control unit configured to generate a second control signal controlling the plurality of input/output switches in response to a first control signal and a page size signal.

16. The semiconductor memory of claim 15, wherein the first control signal is activated by a row active signal.

17. The semiconductor memory of claim 9, wherein when the page size signal defines the first page size, a plurality of control units are configured to output a first control signal and a second control signal pair.

18. The semiconductor memory of claim 11, wherein when the page size signal defines the second page size, a plurality of control units are configured to inactivate a second control signal and output a first control signal as the second control signal.

19. The semiconductor memory of claim 9, wherein when the page size signal defines the first page size, a plurality of control units are configured to output a first control signal as a second control signal pair.

20. The semiconductor memory of claim 11, wherein when the page size signal defines the second page size, a plurality of control units are configured to inactivate a second control signal at a level independent of a first control signal.

21. A system comprising:

a processor;

a controller configured to receive a request and a data from the processor; and a memory device configured to receive the request and the data from the controller, wherein the memory device comprises:

a plurality of unit memory blocks;

a control unit configured to generate a plurality of second control signals in response to a page size signal and a plurality of first control signals;

a plurality of input/output switches configured to couple first data line sets of the plurality of unit memory blocks to second data line sets in response to the plurality of second control signals; and a plurality of page change switches configured to couple one set of the first data line sets to another set of the first data line sets in response to the page size signal, wherein the one set is coupled to one of the plurality of unit memory blocks, and the another set is coupled to another of the plurality of unit memory blocks, and wherein the plurality of input/output switches are directly coupled to the the plurality of page change switches.

22. The semiconductor memory of claim 1, wherein the first data line sets are coupled to bit lines of the plurality of unit memory blocks.

23. The semiconductor memory of claim 7, wherein the first segment input/output line is coupled to a bit line of the first unit memory block.

24. The system of claim 21, wherein the first data line sets are coupled to bit lines of the plurality of unit memory blocks.

* * * * *